United States Patent
Mercier-Calvairac et al.

(10) Patent No.: US 12,305,582 B2
(45) Date of Patent: May 20, 2025

(54) TURBOGENERATOR WITH SIMPLIFIED CONTROL SYSTEM FOR AIRCRAFT

(71) Applicants: SAFRAN HELICOPTER ENGINES, Bordes (FR); SAFRAN POWER UNITS, Toulouse (FR)

(72) Inventors: Fabien Mercier-Calvairac, Moissy-Cramayel (FR); Patrick Marconi, Moissy-Cramayel (FR); Denis Antoine Julien Real, Moissy-Cramayel (FR)

(73) Assignees: SAFRAN HELICOPTER ENGINES, Bordes (FR); SAFRAN POWER UNITS, Toulouse (FR)

( * ) Notice: Subject to any disclaimer, the term of this patent is extended or adjusted under 35 U.S.C. 154(b) by 25 days.

(21) Appl. No.: 17/608,685

(22) PCT Filed: Jul. 3, 2020

(86) PCT No.: PCT/EP2020/068804
§ 371 (c)(1),
(2) Date: Nov. 3, 2021

(87) PCT Pub. No.: WO2021/001527
PCT Pub. Date: Jan. 7, 2021

(65) Prior Publication Data
US 2022/0213842 A1   Jul. 7, 2022

(30) Foreign Application Priority Data

Jul. 3, 2019 (FR) ...................... 1907426

(51) Int. Cl.
*F02C 9/30* (2006.01)
*B64D 27/02* (2006.01)
*F02C 9/28* (2006.01)

(52) U.S. Cl.
CPC .............. *F02C 9/30* (2013.01); *B64D 27/026* (2024.01); *F02C 9/28* (2013.01); *F05D 2220/76* (2013.01);
(Continued)

(58) Field of Classification Search
CPC ....................................................... F02C 9/30
See application file for complete search history.

(56) References Cited

U.S. PATENT DOCUMENTS

| | | | | |
|---|---|---|---|---|
| 3,032,986 A | * | 5/1962 | Wright | F02C 9/28 60/39.091 |
| 2005/0116689 A1 | * | 6/2005 | Fogarty | H02P 9/04 322/29 |

(Continued)

FOREIGN PATENT DOCUMENTS

| CA | 3 006 123 A1 | 12/2018 |
|---|---|---|
| CN | 109018380 A | 12/2018 |
| GB | 651 599 A | 4/1951 |

OTHER PUBLICATIONS

International Search Report issued Sep. 18, 2020 in International Application No. PCT/EP2020/068804.

(Continued)

*Primary Examiner* — Katheryn A Malatek
(74) *Attorney, Agent, or Firm* — Sughrue Mion, PLLC

(57) ABSTRACT

A propulsion assembly for aircraft includes a single-shaft engine turbomachine including a combustion chamber and a rotatably mounted shaft that turns at a turbomachine rating; an electrical generator coupled to the shaft; and a control system. The control system includes a fuel pump that brings fuel into the combustion chamber at a fuel flow rate which is a direct function of an ambient pressure and of the turbomachine rating, and power electronics that are coupled to the electrical generator and that control an electrical (Continued)

power drawn off the electrical generator so as to attain a target turbomachine rating.

10 Claims, 4 Drawing Sheets

(52) U.S. Cl.
CPC .. *F05D 2270/312* (2013.01); *F05D 2270/335* (2013.01)

(56) References Cited

U.S. PATENT DOCUMENTS

| | | | |
|---|---|---|---|
| 2013/0049364 A1* | 2/2013 | Teets | H04W 64/00 290/45 |
| 2015/0082802 A1* | 3/2015 | Cointe | F02C 9/48 60/779 |
| 2018/0229851 A1 | 8/2018 | Joshi et al. | |
| 2018/0354631 A1 | 12/2018 | Adibhatla et al. | |
| 2019/0002116 A1 | 1/2019 | Gansler et al. | |
| 2020/0191058 A1* | 6/2020 | Turney | F02C 7/236 |

OTHER PUBLICATIONS

Search Report issued Feb. 28, 2020 in French Application No. 1907426.

* cited by examiner

TURBOGENERATOR WITH SIMPLIFIED CONTROL SYSTEM FOR AIRCRAFT

CROSS REFERENCE TO RELATED APPLICATIONS

This application is a National Stage of International Application No. PCT/EP2020/068804 filed Jul. 3, 2020, claiming priority based on French Patent Application No. 1907426 filed Jul. 3, 20219, the entire contents of each of which being herein incorporated by reference in their entireties.

FIELD OF THE INVENTION

This invention relates to the field of control of propulsion assemblies for aircraft, particularly the control systems of turbogenerators.

PRIOR ART

This invention has a wide application in all types of aircraft, for example but without limitation VTOL (Vertical Take-Off and Landing) type aircraft, and particularly hybrid aircraft.

The aircraft generally comprise a propulsion system, for example at least one propeller, actuated by a propulsion assembly, comprising at least a turbomachine having a combustion chamber supplied with fuel by a fuel pump.

A control system in particular controls the rating of the turbomachine, i.e. the speed of rotation of the shaft driving, in particular, the turbine of the turbomachine, which depends in particular on the flow rate of the fuel injected into the combustion chamber by the fuel pump.

To reduce the consumption of fuel and produce hybrid aircraft making it possible to access electrical flights, it is advisable to use a propulsion assembly also comprising an electrical generator, coupled to the rotatably-mounted shaft of the turbomachine, i.e. to use a turbogenerator.

Specifically, if the capacity of the electrical energy-storing means increases, particularly the capacity of chemical batteries, their energy provision is still too small with respect to the overall dimensions and weight imposed on the aircraft, their energy density is too low such that the electrical energy storing means alone do not themselves make it possible to supply the propulsion system of an aircraft, and thus they do not currently provide, alone, a viable alternative to run an aircraft on regular flights.

In any case, to make this type of hybrid aircraft more accessible, it is necessary to reduce its development and manufacturing cost. The development and manufacturing cost of the turbogenerator is in particular very high, and in particular the cost of the control system of the turbomachine can account for up to 30% of the overall cost of the turbomachine.

In the field of aeronautics, the turbogenerator control system generally comprises sensors, at least one actuator actuating a fuel metering unit and a computer. This control system makes it possible to precisely control the quantity of fuel to be injected into the combustion chamber of the turbomachine in order to control the rating and the output torque of the turbomachine in the aim of delivering at all times enough power to produce electricity using the electrical generator coupled to the turbomachine.

Specifically, without precise control of the turbomachine in terms of speed and/or torque, the electrical generator cannot produce the right level of electrical power. Thus, it is necessary to precisely and constantly drive the actuator driving the position of the fuel metering unit controlling the flow rate of fuel injected, particularly via closed-loop control laws, comprising for example many Proportional-Integral (PI or PID) controllers, which are expensive and burdensome to develop and implement.

In addition, the need for control of the mechanical power at the output of an aeronautical turbomachine, directly affecting the reliability of the propulsion system of the aircraft, requires functionality and monitoring particularly involving costly certifications, in order to guarantee the safety of a user.

A propulsion assembly for an aircraft 100' comprising a turbogenerator (1,2) with a control system 7 as known to date is schematically illustrated by FIG. 1.

The control system 7 comprises:
  a plurality of sensors (73,74), comprising at least a first set of sensors 74 not located in the hot region, allowing for example the measurement of the pressure and of the ambient temperature, and comprising a sensor allowing the measurement on the shaft 3 of the rating of the turbomachine 1, and a second set of sensors 73 located in the hot region, allowing the measurement of the pressure at the outlet of the compressor 12 of the turbomachine 1 and a measurement of the temperature at the outlet of the High Pressure turbine 11 of the turbomachine 1;
  a computer 71, for example an Electronic Control Unit (ECU) on which are implemented several complex laws governing the control of the turbomachine 1, requiring a high development cost and costly certifications;
  a pump 75, coupled to actuators 72, typically hydromechanical of servovalve or fuel metering unit type, comprising a unit for Full Authority Digital Engine Control (FADEC), allowing the controlling of the fuel flow rate stored in a reservoir 5 and injected into a combustion chamber 13.

As explained previously, this type of control system 7, independent of the driving of other machines of the aircraft, is both complex and expensive. The electrical generator 2 generally produces a three-phase voltage, the frequency of which will be dependent on the rating of the turbomachine 1, driven by the control system 7.

In addition, the sensors 73 located in the hot area are subject to very stringent requirements and are a source of malfunctions, which poses a reliability problem, and a risk for the safety of a user.

The document CA 3 006 123 describes a propulsion assembly for aircraft comprising a turbomachine and an electrical generator. However, in document CA 3 006 123, the power electronics is not aimed at the control of the rotation speed of the turbines of the turbomachine but aims to ensure that the deviation between the rotation speed of the high-pressure turbine and the rotation speed of the low-pressure turbine are in a predetermined range, and without seeking to control the absolute value of the rotation speed of one of the turbines of the turbomachine.

The document U.S. 2019/002116 and the document U.S. 2018/229851 each describe a propulsion assembly for aircraft comprising a turbomachine and an electrical motor. In the document U.S. 2019/002116 and the document U.S. 2018/229851, the electrical motor is used to supply a rotational torque to the turbine of the turbomachine.

SUMMARY OF THE INVENTION

A general aim of this invention is to propose a solution to the identified problems, and particularly to reduce the development and manufacturing costs of propulsion assemblies for aircraft, and in particular of the systems for controlling turbomachines, while meeting safety and reliability requirements, particularly by dispensing with the use of sensors in the hot region.

The aforementioned aims are attained by this invention owing to a propulsion assembly for aircraft as claimed in claim 1 and a control method as claimed in claim 8.

DESCRIPTION OF THE FIGURES

Other features, aims and advantages of the invention will become apparent on reading the following detailed description, and with reference to the appended drawings, given by way of non-limiting example and wherein.

DETAILED DESCRIPTION OF THE INVENTION

As explained previously, a hybrid aircraft is generally propelled by a propulsion assembly 100 comprising a thermal machine of turbomachine 1 type combined with a generator 2.

According to the invention, provision is made for combining a turbomachine, for example of single-shaft engine type, with an electrical generator. It is through the generator and the driving of the electrical power delivered at the output that the turbomachine will be able to be controlled in its ratings owing to specific power electronics (EP) capable of controlling the electrical output power as a function of the generator rotation rating.

Preferably, the torque of the turbomachine is a consequence tabulated as an open loop in a variable-displacement fuel pump.

According to the invention, provision is made for a control strategy and simplified components that make it possible to dispense with the main sensors, actuators and its complex computer to correctly control the electrical energy produced by the generator.

One possibility for control is as follows, under nominal operation:

The turbomachine, for example of single-shaft engine turbomachine type, is fuel-controlled via a direction function of the ambient pressure and its rotation rating (so-called turbomachine rating); and The power drawn off the attached electrical generator is controlled owing to power electronics (EP) to attain a rotation speed target of the turbomachine.

Figure 2:
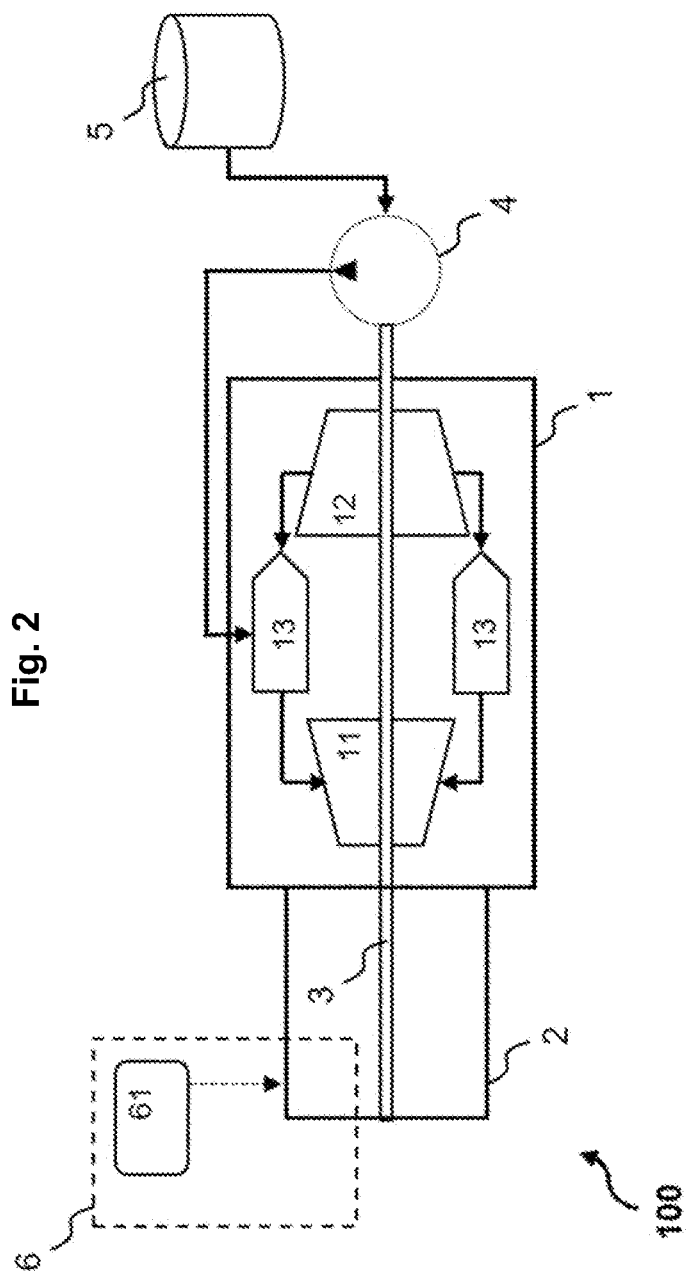
FIG. 2 shows a diagram of a propulsion assembly for aircraft according to a first exemplary embodiment.

FIG. 2 illustrates a propulsion assembly 100 according to a first exemplary embodiment. The turbomachine 1 generally comprises a rotatably mounted shaft 3, intended to turn a turbomachine rating, to which is coupled the generator 2. The turbomachine 1 also comprises at least one combustion chamber 13.

In a non-limiting exemplary embodiment, a single-shaft engine turbomachine 1 is considered, i.e. a turbomachine 1 comprising at least one compressor 12 mechanically linked to the turbine 11 by way of the rotatably mounted shaft 3. Thus, the shaft 3 drives the compressor 12 and the turbine 11 at a same rotation speed, also known as the turbomachine rating.

The electrical generator 2, off which an electrical power is intended to be drawn, makes it possible to supply electricity to various on-board systems (propulsive or non-propulsive) of the aircraft.

The generator 2 can be an electrical generator comprising a rotor and a stator, and being directly coupled to the turbomachine 1, i.e. the rotor of the electrical generator 2 is driven by the shaft 3 of the turbomachine 1. Thus, the rotor of the generator 2 can be coupled directly to the shaft 3 and thus turn at the same rotation speed as the turbine 11 and the compressor 12 of the turbomachine 1, or alternatively be coupled to the shaft 3 by way of a reduction gear (not illustrated), and thus turn at a lower rating.

The propulsion assembly 100 also comprises a control system 6, making it possible to control the operation of the propulsion assembly, in order for example to attain a target turbomachine rating. The control system 6 comprises a fuel pump 4 intended to bring fuel, stored in a fuel reservoir 5, into the combustion chamber 13 with a certain fuel flow rate.

With such a fuel pump 4, the fuel flow rate is a direct function of an ambient pressure and of the turbomachine rating, as will be detailed below.

As illustrated in FIG. 2, the fuel pump 4 can be mechanically driven by the turbomachine 1.

Preferably, the fuel pump 4 is configured to supply a fuel flow rate proportional to the ambient pressure and increasing with the rating of the turbomachine.

The fuel pump 4 can be part of the control system 6 passively, i.e. its operation and particularly the injected fuel flow rate can mechanically result from the turbomachine rating, for example when the fuel pump 4 is a mechanical pump in direct engagement with the turbomachine, i.e. the actuation of the fuel pump 4 is mechanically driven by the rotation of the shaft 3 of the turbomachine 1. This is referred to as a fuel pump in direct engagement. This type of pump is in common use (mechanical pump). The usual rotation ratings of the fuel pumps are much lower than the rotating ratings of the turbomachines, so there is of necessity a reduction gear, integrated into the pump or not. The type of reduction gear can be either a gear train, or an epicyclic gear.

In an exemplary embodiment, the fuel flow rate depends directly on the turbomachine rating and on the ambient pressure. Preferably, the fuel pump 4 is calibrated to inject fuel into the combustion chamber 13 at a fuel flow rate proportional to the turbomachine rating.

Preferably, the displacement of the fuel pump 4 can be proportional to the ambient pressure (equivalent to the atmospheric pressure), such that the fuel flow rate is proportional to the ambient pressure.

The fuel pump 4 can alternatively be part of the control system 6 actively, the fuel pump 4 being electrical and the fuel flow rate injected into the combustion chamber 7 being driven by control electronics. The fuel pump 4 can for example be a fuel metering pump (FMP).

Advantageously, the control electronics of the electrical fuel pump 4 can comprise an integrated metering system, comprising a tabulation used to link the rating of the turbomachine and the ambient pressure to the fuel flow rate to be injected. The turbomachine rating and the ambient pressure can be measured by specific sensors. The fuel flow rate injected by the electrical fuel pump 4 is a simple function of the turbomachine rating multiplied by the ambient pressure. For example, for a machine of 150 kW class, the full-load fuel rate is in the order of 70 kg/h, and the stabilization rating is of 100%. If the load is removed, the rating convergence (dynamically obtained according to the driving method set out above) will be at 71% of the nominal rating, and the resulting fuel flow rate will be of 20 kg/h. A linear interpolation between these points will make it possible to determine the stabilization rating as a function of the fuel flow rate. This principle of a simple control is applicable whatever the size of the turbogenerator, by adapting the fuel flow rate at full load and zero load.

Figure 3:
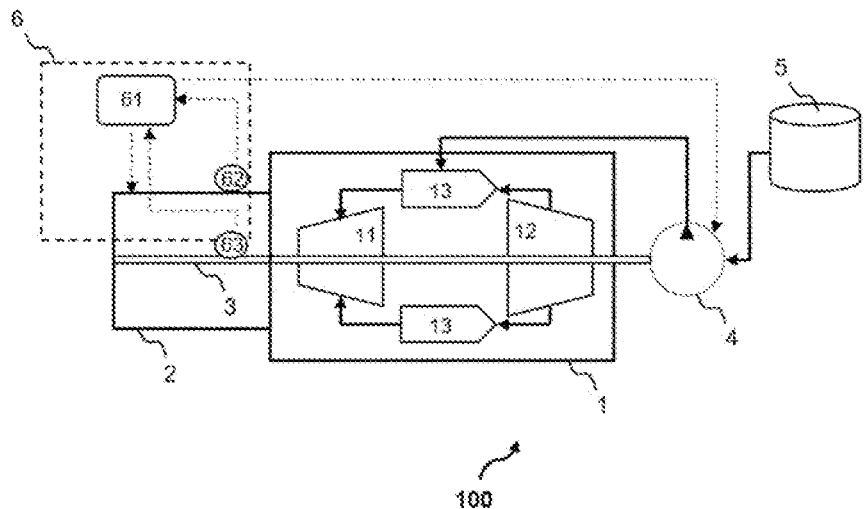
FIG. 3 shows a diagram of a propulsion assembly for aircraft according to a second exemplary embodiment.

In an exemplary embodiment, illustrated for example on FIG. 3, a rotation speed sensor 63, for example an inductive sensor disposed near the rotating shaft 3, an optical sensor or a sensor equipped with optical fiber, is configured to measure the turbomachine rating and transmit this information to the metering system integrated into the fuel pump 4.

An ambient pressure sensor 62, disposed for example outside the propulsion assembly 100, is configured to measure the ambient pressure or atmospheric pressure and transmit this information to the metering system integrated into the fuel pump 4.

The electrical fuel pump 4 is particularly advantageous, since it allows a stable start, as will be detailed below.

The control system 6 also comprises specific power electronics 61, coupled to the electrical generator 2. The power electronics 61 of the control system 6 is capable of controlling the electrical power drawn at the output of the electrical generator 2, as a function of the rotation speed of the electrical generator 2 and therefore of the turbomachine rating.

The power electronics 61 can control the electrical power drawn off the electrical generator 2, and consequently control the turbomachine rating, as will be detailed below.

Preferably, the quantity of fuel to be injected into the combustion chamber 13 is predefined by an initial tuning of the control system on the bench that will be used to generate a table determining the flow rate to be injected as a function of the rotating rating and the ambient pressure, such that the turbomachine rating attained can be consequently defined. This table will be used to define the open-loop control of the turbomachine and makes it possible to dispense with a complex control development to be certified.

The power electronics 6 makes it possible to attain a target turbomachine rating (Ncible) as a consequence. The rating obtained is therefore directly related to the load drawn.

Figure 1:
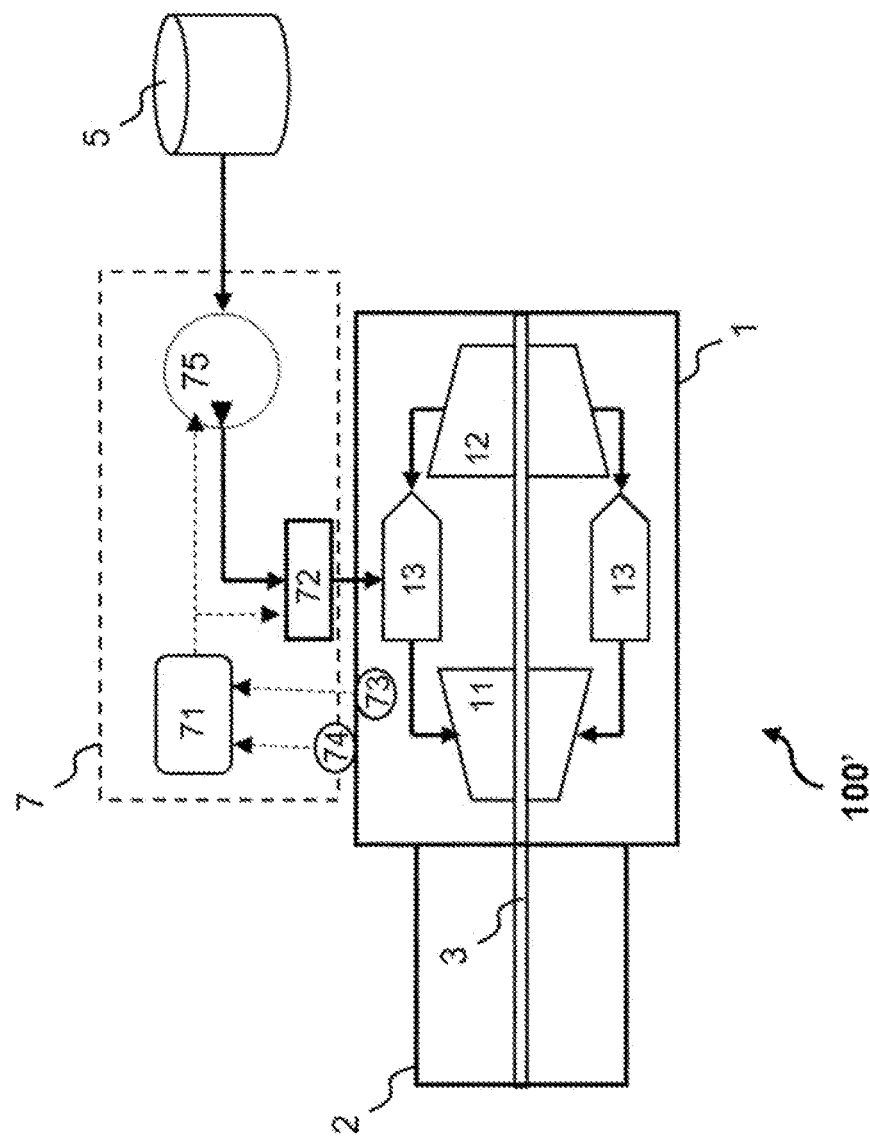
FIG. 1 shows a diagram of a control system for a propulsion assembly for aircraft comprising a turbogenerator as known from the prior art.

This type of control system 6 is particularly advantageous as it makes it possible to dispense with the computer 71 of the control systems 7 of the prior art illustrated in FIG. 1, which are complex and have a high cost.

Figure 4:
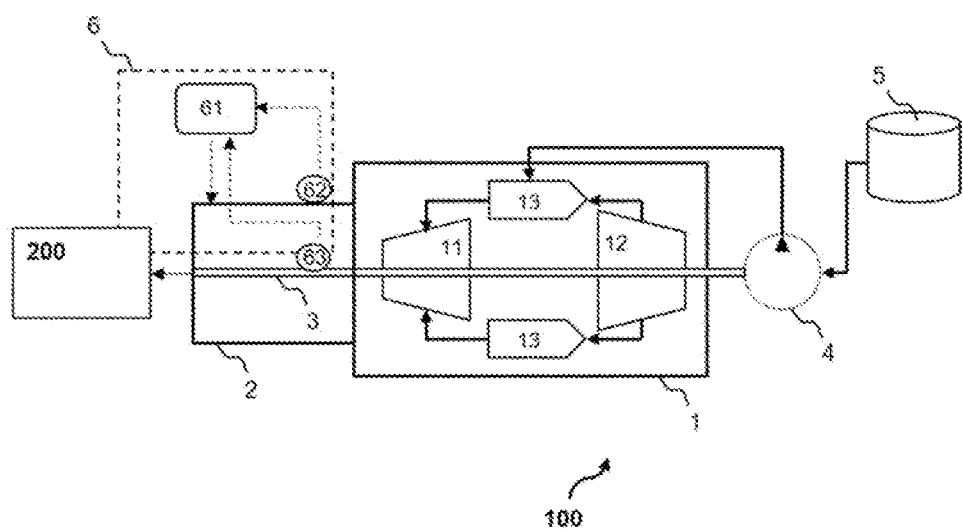
FIG. 4 shows a diagram of a propulsion assembly for aircraft according to a third exemplary embodiment.

Advantageously, and as illustrated in FIG. 4 by a third exemplary embodiment, the propulsion assembly 100 for aircraft comprises an energy-storing means 200, such as for example an electrical energy storing means, typically a battery.

The energy-storing means 200 can be used to supply an electrical power to the different on-board systems of the aircraft when the electrical generator 2 does not supply sufficient power. This makes it possible to increase the reliability of the propulsion assembly. In this way, it is possible to obtain a propulsion assembly which meets the requirement for power and energy while mastering the on-board mass of the aircraft.

For example, the energy-storing means 200 can be configured to supply an additional electrical power when the electrical power drawn is less than a target electrical power (Pcible), or more generally, when the electrical power drawn is insufficient to fulfil all the electricity requirements of the aircraft. This can be the case at start-up or in transient ratings. The electrical energy-storing means 200 makes it possible to considerably reduce the requirement for responsiveness of the turbogenerator (1,2).

Preferably, the propulsion assembly 100 for aircraft comprises at least one ambient pressure sensor 62 and an engine health monitoring system. The engine health monitoring system is configured to compare the drawn electrical power to a given rating depending on the ambient pressure.

Preferably, the propulsion assembly 100 for aircraft comprises at least one sensor of the turbomachine rating 63 and an overspeed monitoring system configured to control the turbomachine rating in the event of a malfunction of the control system 6.

The overspeed monitoring system is particularly advantageous in the event of the control system 6 having malfunctions, and particularly makes it possible to check that the turbomachine rating is not above a certain limit rating, above which there would be a risk of damage to the propulsion assembly, and in particular rotating parts of the turbomachine. The monitoring carried out makes it possible to control divergences.

It will be noted that the monitoring system can be integrated into an electronic control unit ECU, for example on a specific board.

The monitoring system can also be totally independent, for example being disposed in a separate box, coupled to the propulsion assembly.

In general, the propulsion assembly 100 can operate in different phases.

According to another aspect, provision is made for a method for controlling a propulsion assembly 100 for aircraft comprising a single-shaft engine turbomachine 1, having a combustion chamber 13 and a shaft 3 rotatably mounted and intended to turn at a turbomachine rating, and an electrical generator 2 coupled to the shaft of the turbomachine.

Advantageously, the control method can be implemented in a propulsion assembly 100 for aircraft as previously described.

In an exemplary embodiment, the control method comprises the steps consisting in:
  bringing fuel into the combustion chamber 13 by way of a fuel pump 4 by enforcing a fuel flow rate according to a direct function of an ambient pressure and of the turbomachine rating; and
  drawing an electrical power off the electrical generator, the drawn electrical power being controlled by power electronics coupled to the electrical generator such as to attain a target turbomachine rating.

According to a conventional example of operation in a start-up phase, called starter mode, electrical energy is injected into the generator (which will take the role of electrical starter) to allow the turbomachine to be set in rotation. The injection of fuel via the simplified control system is calibrated to be effective from a determined rotation rating (typically 10% of the nominal rating), in order to initiate the combustion via the operation of the igniters.

The mixture of compressed air and fuel is ignited in the at least one combustion chamber 13 by at least one igniter or ignition plug, in order to cause the expansion of the mixture, which passes through the single-engine shaft 11 of the turbomachine 1, driving the compressor 12 and the fuel pump 4 by way of the rotatably mounted shaft 3.

Preferably, the starter mode is maintained as long as the turbomachine rating is less than a rating threshold N1 (10 to 20% of the nominal rating). At least one igniter is then active, and the generator 2 operates in engine mode, i.e. it does not convert mechanical energy into electrical energy, but on the contrary assists the turbomachine 1 by supplying a torque to the rotation shaft 3, such as to increase the turbomachine rating.

Preferably, as long as the turbomachine rating is less than the rating threshold of the turbomachine N1, the fuel pump 4 supplies the combustion chamber 13 with a fuel flow rate proportional to the turbomachine rating. Typically the fuel flow rate can be equal to the product of the turbomachine rating and the ambient pressure.

This starter mode is advantageous, as it makes it possible to ensure continuity of movement.

After a certain time, for example a few seconds, preferably a few milliseconds, an intermediate phase is attained, in which the igniter is deactivated and the electrical generator 2 no longer serves to drive the turbomachine 1, i.e. the turbomachine 1 operates autonomously without the assistance of the electrical generator 2.

Preferably, the intermediate phase is attained if the rating of the turbomachine is above the first turbomachine rating threshold N1 and less than a second turbomachine rating threshold N2 (20% of the nominal rating.) The electrical generator 2 is not operational, and could even be uncoupled from the shaft 3. The fuel pump 4 is configured to inject fuel into the combustion chamber 13 such that the rating of the turbomachine increases until it reaches the second rating threshold N2.

In a preferred exemplary embodiment, when the second turbomachine rating threshold N2 is attained, a final phase is attained in which the electrical generator 2 operates in generator mode, being in particular coupled to the rotating shaft 3 of the turbomachine 1. Preferably, the igniter remains deactivated. The drawn electrical power is then controlled by the power electronics 61 to attain a nominal turbomachine rating, i.e. the operating rating of the turbomachine 1 corresponding to the maximum efficiency of the turbomachine 1. Specifically, the compressor 12 and the turbine 11 of the turbomachine 1 are designed for a given operating point, for which the efficiency is maximal. This nominal operating point is characterized, for standard pressure and temperature conditions, by a fuel flow rate and a pressure (or release) rate and this is done for a given rotation speed or turbomachine rating.

The desired nominal rating particularly depends on the mechanical load on the shaft 3 of the turbomachine 1. For example during a higher electrical power requirement, it may be necessary to increase the mechanical load on the shaft 3 of the turbomachine 1. To do this, it is therefore necessary to increase the fuel flow rate, and therefore the turbomachine rating.

Conventionally, an increase in the drawn power or the electrical load leads to a higher mechanical load, and therefore tends to reduce the turbomachine rating.

In a preferred exemplary embodiment, the control system 6 is designed to drive the electrical power drawn off the electrical generator 2, such as to enforce the turbomachine rating, and consequently the fuel flow rate of the fuel pump 4, as previously explained.

Figure 5:
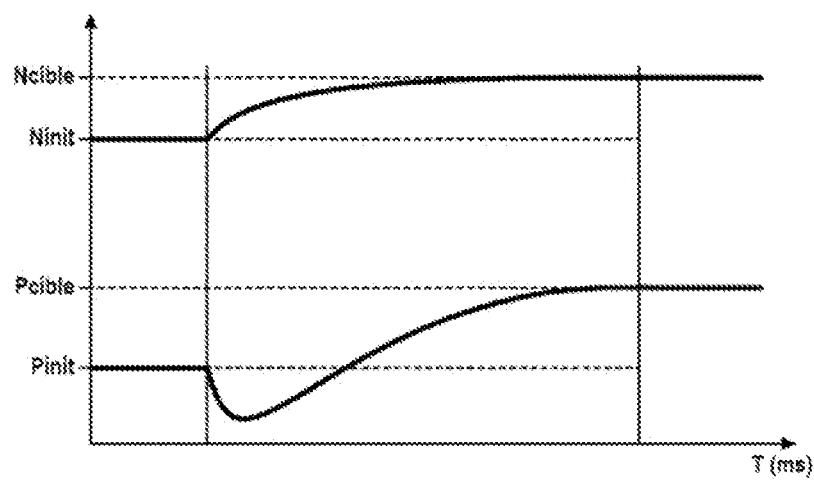
FIG. 5 schematically illustrates the variation in the rating of the turbomachine and of the power drawn off the generator as a function of time according to an exemplary embodiment.

An example of this driving is schematically illustrated in FIG. 5. At a first time, the so-called initial time, the turbomachine 1 has an initial turbomachine rating Ninit and the initial power drawn off the electrical generator 2 is equal to Pinit.

To allow the acceleration of a propulsion system or to respond to a variation in the environment for example, it may be necessary to attain a higher target turbomachine rating Ncible than the initial turbomachine rating Ninit.

Advantageously, the electrical generator 2 can thus be driven by the power electronics 61, upstream of a mechanical load sensed on the turbomachine 1, such as to reduce the resistive torque and therefore the electrical load transiently and thus allow the acceleration of the turbomachine 1, i.e. the drawn electrical power P decreases transiently such as to increase the turbomachine rating N to attain the target turbomachine rating Ncible, then the drawn electrical power increases to attain the target electrical power Pcible and a constant turbomachine rating stabilized to the target turbomachine rating Ncible.

For example, the constant turbomachine rating attained can be the desired nominal operating rating.

Preferably, the target electrical power Pcible varies relatively slowly.

Thus, the power electronics 61 of the control system 6 drives a transient turbomachine rating phase and a level of acceleration of the turbomachine 1 solely by driving the electrical load or power drawn off the electrical generator 2.

By symmetry, when the requirement for electrical power is smaller, it may be necessary to reduce the mechanical load on the shaft 3 of the turbomachine 1. To do this, it is therefore necessary to reduce the fuel flow rate, and therefore the turbomachine rating.

In the same way, advantageously, the electrical generator 2 can thus be driven by the power electronics 61, upstream of a decrease in the electrical power sensed, such as to increase the resistive torque or mechanical load drawn by the generator 2 and therefore the electrical load transiently, and thus allow a deceleration of the turbomachine 1, i.e. the drawn electrical power increases transiently such as to reduce the turbomachine rating, then the drawn electrical power decreases to attain the target electrical power and a constant turbomachine rating.

The power electronics 61 can thus be configured to control the electrical power drawn off the electrical generator 2 upstream of a lower electrical power requirement, such as to transiently increase the drawn electrical power such as to reduce the turbomachine rating, then reduce the drawn electrical power to attain the target electrical power and a constant turbomachine rating.

Preferably, the control system 6 may comprise a monitor used to sense electrical loads.

In an exemplary embodiment, the electrical generator 2 is configured to constantly draw power off the shaft 3 of the turbomachine 1, outside the start-up phase. As explained previously, the turbomachine rating is therefore adjusted as a function of the electrical power draw, in a manner proportionate with the electrical load sensed. The maximum rating of the turbomachine 1 is obtained by correspondence with the maximum draw point.

Figure 6:
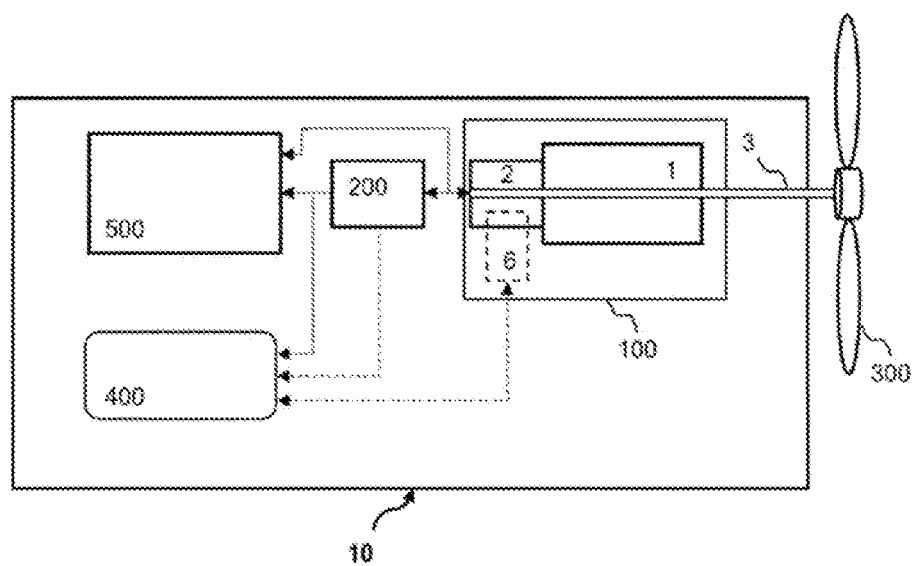
FIG. 6 shows a diagram of an aircraft comprising a propulsion assembly for aircraft according to an exemplary embodiment.

According to another aspect, schematically illustrated in FIG. 6, the propulsion assembly 100 previously described can be implemented on an aircraft 10, for example an aircraft of VTOL (Vertical Take-Off and Landing) type.

The propulsion assembly 100 is connected to a propulsion system 300 of the aircraft 10, for example of propeller type, to allow the proper operation of the aircraft 10 during a flight.

The propulsion assembly 100 can also be connected to an energy monitoring system 400 of the aircraft 10. Preferably, the energy monitoring system 400 is capable of exchanging information with the control system 6, and in particular sending commands or setpoints.

Preferably, as illustrated in FIG. 6, the aircraft 10 comprises an energy-storing means 200, for example an electrical energy storing means, typically a battery.

In an exemplary embodiment, the energy monitoring system 400 is configured to drive the power drawn off the electrical generator 2 as a function of an instantaneous request of the propulsion system 300, a load state of the possible electrical energy storing means 200 and/or a target value of a load level of the storing means 200.

The electrical generator 2, from which the electrical generator is drawn, can make it possible to supply electricity to the different systems (propulsive or non-propulsive) of the aircraft. The energy-storing means 200 can also make it possible to supply electrical power to the various on-board systems 500 of the aircraft 10, or to other uses requiring electrical consumption, particularly when the electrical generator 2 does not supply sufficient power.

The reader will understand that many modifications can be made without significantly departing from the new teachings and advantages described here. Consequently, all modifications of this type are intended to be incorporated within the scope of the propulsion assembly and the control method set out.

The invention claimed is:

1. A propulsion assembly for aircraft, the propulsion assembly comprising:
    a single-shaft engine turbomachine comprising a combustion chamber and a rotatably mounted shaft configured to turn at a turbomachine rating;
    an electrical generator coupled to the shaft;
    at least one ambient pressure sensor;
    an engine health monitoring system and
    a control system, the control system comprising:
        a fuel pump configured to bring fuel into the combustion chamber at a fuel flow rate which is a direct function of an ambient pressure and of the turbomachine rating; and
        power electronics coupled to the electrical generator and configured to control an electrical power drawn off the electrical generator, so as to attain a target turbomachine rating,
        the engine health monitoring system being configured to compare the electrical power drawn to a planned electrical power depending on the ambient pressure.

2. The propulsion assembly for aircraft as claimed in claim 1, wherein the fuel pump is configured so that the fuel flow rate is proportional to the ambient pressure and increases with the turbomachine rating.

3. The propulsion assembly for aircraft as claimed in claim 2, wherein
    the fuel pump is a mechanical pump in direct engagement with the turbomachine; and
    the fuel flow rate mechanically depends on the turbomachine rating and on the ambient pressure.

4. The propulsion assembly for aircraft as claimed in claim 2, further comprising:
    a sensor that senses the turbomachine rating; and
    an ambient pressure sensor that senses the ambient pressure,
    wherein the fuel pump is an electrical pump configured to supply the fuel at the fuel flow rate as a function of the ambient pressure and the turbomachine rating.

5. The propulsion assembly for aircraft as claimed in claim 1, further comprising an energy-storing system configured to supply an additional electrical power when the electrical power drawn is less than a target electrical power.

6. The propulsion assembly for aircraft as claimed in claim 1, further comprising at least one sensor that senses the turbomachine rating, and an overspeed monitoring system configured to control the turbomachine rating in the event of a malfunction of the control system.

7. A method for controlling a propulsion assembly for aircraft, the method comprising:
    bringing fuel into a combustion chamber of a single-shaft engine turbomachine by a fuel pump by enforcing a fuel flow rate according to a direct function of an ambient pressure and of a turbomachine rating at which the shaft of the turbomachine turns; and
    drawing electrical power off an electrical generator coupled to the shaft under control of power electronics, so as to attain a target turbomachine rating,
    the power electronics being configured to control the electrical power drawn off the electrical generator as a function of a power requirement that is lower that the electrical power drawn so as to transiently increase the drawn electrical power and reduce the turbomachine rating, then reduce the drawn electrical power to attain the target electrical power and a constant turbomachine rating.

8. The control method as claimed in claim 7,
    wherein the drawn electrical power and the fuel flow rate depend on a first threshold and a second threshold, and wherein:
    if the turbomachine rating is less than the first threshold, the electrical generator operates in an engine mode in which the electrical generator assists the turbomachine and the fuel flow rate is proportional to the turbomachine rating;
    if the turbomachine rating is greater than the first threshold and less than the second threshold, the turbomachine is autonomous without the assistance of the electrical generator; and
    if the turbomachine rating is greater than the second threshold, the electrical generator operates in a generator mode and the drawn electrical power is controlled by the power electronics to attain a nominal turbomachine rating.

9. The control method as claimed in claim 7, wherein the power electronics is configured to control the electrical power drawn off the electrical generator as a function of a mechanical load on the turbomachine so as to transiently reduce the drawn electrical power to increase the turbomachine rating, then increase the drawn electrical power to attain the target electrical power and a constant turbomachine rating.

10. A method for controlling a propulsion assembly for aircraft, the method comprising:
    bringing fuel into a combustion chamber of a single-shaft engine turbomachine by a fuel pump by enforcing a fuel flow rate according to a direct function of an ambient pressure and of a turbomachine rating at which the shaft of the turbomachine turns;
    drawing electrical power off an electrical generator coupled to the shaft under control of power electronics by increasing or decreasing a resistive torque applied by the electrical generator to the shaft, so as to attain a target turbomachine rating; and comparing the drawn electrical power to a planned electrical power depending on the ambient pressure.

* * * * *